Aug. 3, 1965 C. Z. SUTTON 3,198,465
HOSE NOZZLE SUPPORT
Filed July 10, 1963 2 Sheets-Sheet 2
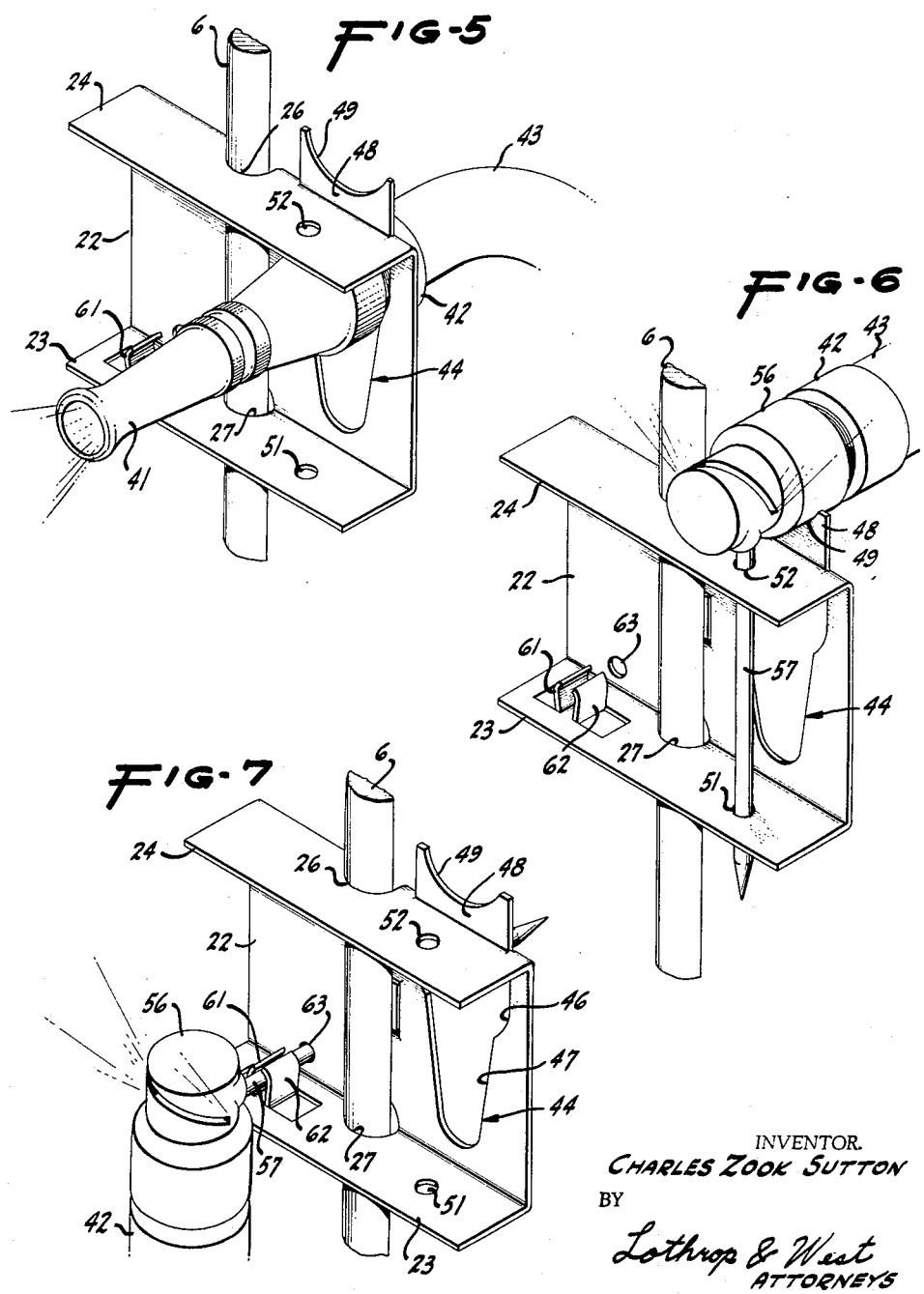
INVENTOR.
CHARLES ZOOK SUTTON
BY
Lothrop & West
ATTORNEYS

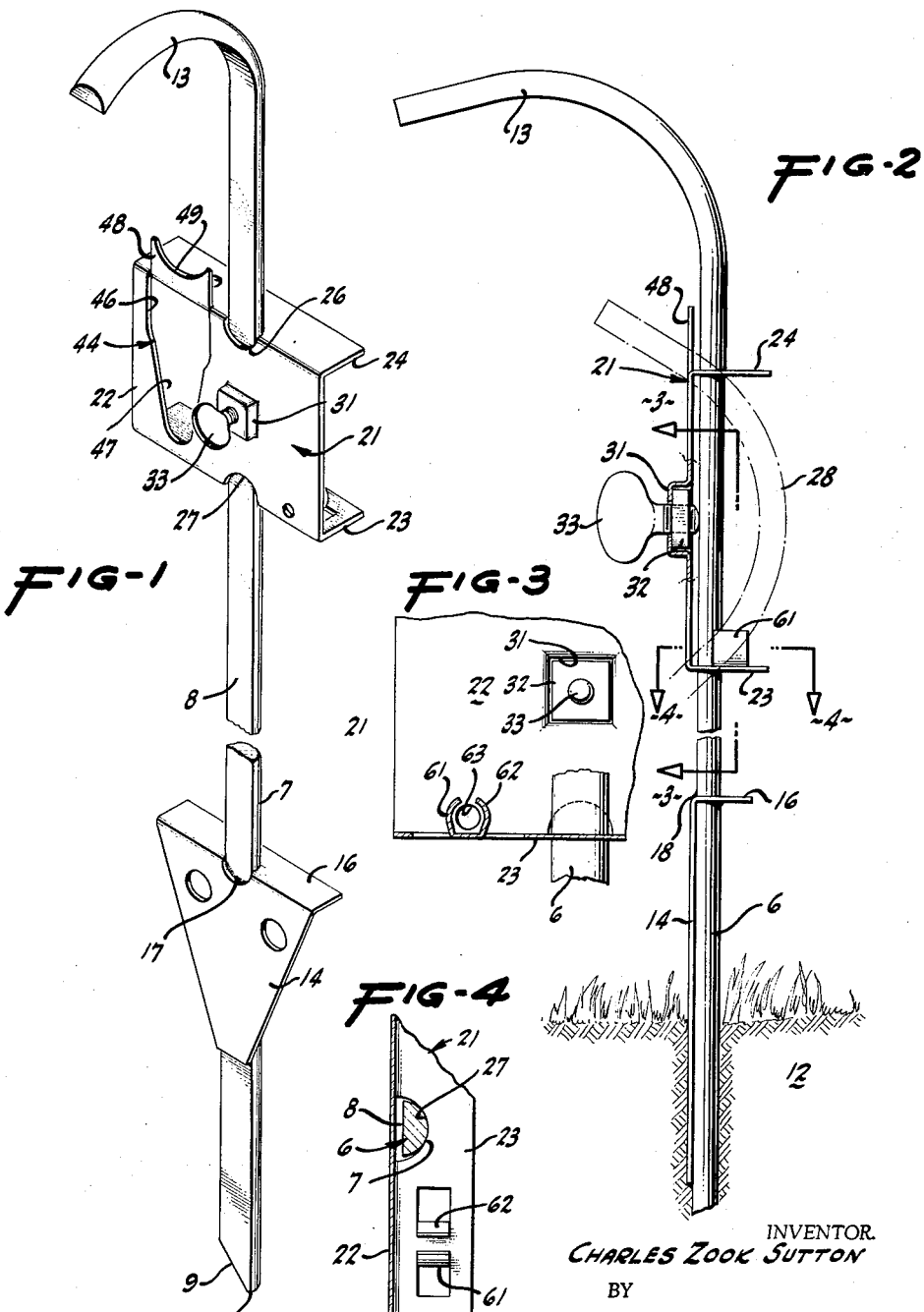

United States Patent Office 3,198,465
Patented Aug. 3, 1965

3,198,465
HOSE NOZZLE SUPPORT
Charles Zook Sutton, 2832 Divisadero St.,
San Francisco, Calif.
Filed July 10, 1963, Ser. No. 294,204
3 Claims. (Cl. 248—87)

My invention relates to means primarily useful by gardeners, especially domestic gardeners, in watering their flowers, vgetables and other plants and is designed for ready use by men and women without undue effort in locating a hose and nozzle combination for irrigation purposes.

It is an object of my invention to provide a hose nozzle support which will accommodate any of several different kinds of hose nozzles in any of a number of different positions so that the hose nozzle can be located in the garden not only in the proper spot but also at the desired elevation and in a selected direction so that the water issuing from the nozzle will be directed as desired.

Another object of the invention is to provide a hose nozzle support that can easily and readily be positioned in the ground despite differences in resistance of the soil.

Another object of the invention is to provide a hose nozzle support that can readily be changed from one location to another in a rapid and clean fashion.

Another object of the invention is to provide a hose nozzle support which can easily and cheaply be manufactured and sold and which will require little or no attention for repairs throughout its life.

Other objects of the invention together with the foregoing are attained in the embodiment of the invention described in the accompanying description and illustrated in the accompanying drawings, in which:

FIGURE 1 is an isometric projection of the hose nozzle support constructed according to the invention, a portion being removed to reduce the size of the figure;

FIGURE 2 is a side elevation of the structure shown in FIGURE 1, a portion being removed to reduce the size of that figure;

FIGURE 3 is a detailed cross section, the plane of which is indicated by the line 3—3 of FIGURE 2;

FIGURE 4 is a detailed cross section with portions broken away, the plane of section being taken on the line 4—4 of FIGURE 2;

FIGURE 5 is an isometric view of a portion of the apparatus in use with one form of hose nozzle;

FIGURE 6 is a view similar to FIGURE 5 and showing the apparatus in use with a different form of hose nozzle in one position; and FIGURE 7 is a view similar to FIGURES 5 and 6 and showing a form of hose nozzle in a different position of use.

In its preferred form the hose nozzle support preferably includes an upright rod 6 conveniently fabricated of a half round strip of cold rolled steel. The rod 6 in cross section is thus semicircular on one face 7 and is flat on the other face 8. The lower end of the rod 6 is preferably cut off at an angle 9 to provide a point 11 to facilitate thrusting the rod into the ground 12, as shown in FIGURE 2. To assist in this operation, the rod 6 at its upper end is bent to form a handle 13 extending approximately at right angles to the longitudinal extent of the upright rod 6.

Sometimes pressure by the user upon the handle 13 alone is sufficient to guide and force the lower end of the rod into the ground, but under other circumstances the ground is too hard for that operation so that a pedal 14 is provided. This is prefarably a contoured sheet of metal having a step 16 thereon. The pedal is provided with a circular aperture 17 formed prior to the bending of the step 16 so that after bending on the diameter of the aperture there results an opening substantially of the same contour as the rod 6. The pedal is held in place on the rod by appropriate welding 18 or other suitable fastening. The user puts his foot on one or the other sides of the pedal and forces the lower end of the rod into the ground, guiding the rod against the reaction of pressure on one side of the pedal by means of the handle 13 and also using the handle to apply more force.

Adapted to slide on the rod is a frame 21. This conveniently is a metal channel having a web 22, a lower flange 23 and an upper flange 24. The frame is provided with a pair of apertures 26 and 27 originally circular before the channel is bent so that eventually there result, after bending, apertures substantially of the contour of the rod 6. The apertures 26 and 27 are sufficiently large so that the frame 21 can be introduced over the curved handle 13, traversing the curve as indicated by the dotted lines 28 in FIGURE 2, and finally engaging with the straight portion of the rod.

In order that the frame may be firmly retained at any selected or adjusted position throughout the length of the rod down to the pedal 14 which serves as a stop, the web 22 is deformed to provide a square socket 31 adapted loosely to receive an internally threaded nut 32. The nut is nonrotatable in the square socket 31 and is of a thickness so that it cannot escape through the clearance between the web 22 and the rod 6. A thumb screw 33 is threaded through the nut into engagement with the rod 6. By appropriate manipulation of the thumb screw, the frame can be left free to slide upon the rod, or can be tightened and held in any desired position. Since the frame 21 engages the rod through semicircular openings, the frame is not rotatable on the rod.

The frame is provided with means for receiving nozzles of various kinds. One of the standard forms is a nozzle 41 having an elongated, generally cylindrical body with conical portions and a number of circumferential beads. Ordinarily this is screwed upon the ferrule 42 of a hose 43. For use with this form of nozzle, the web 22 is provided with a cutout portion 44 having a relatively wide upper part 46 and a downwardly tapering lower portion 47. The nozzle 41 is easily introduced through the relatively wide portion 46 and then is lowered slightly so that the nozzle jams against the inclined walls of the tapered portion 47, being thus firmly held in position against accidental dislodgment.

Some of the material which is bent out of the way to form the upper portion 46 of the aperture 44 is displaced upwardly to provide an upstanding tab 48 finished with an arcuate upper surface 49. This tab is centralized with respect to aligned apertures 51 and 52 in the flanges 23 and 24 respectively. This arrangement is primarily for use, as shown in FIGURE 6, with another form of nozzle 56. This engages the hose ferrule 42 as before and carries an integral spike 57. In the use of this nozzle, the spike 57 is lowered through the holes 52 and 51 and the nozzle 56 rests in the arcuate portion 49, being thus held against rotation and retained in appropriate position against accidental dislodgment.

It is sometimes desired to place the nozzle 56 in a different orientation. For that reason, the lower flange 23 is also provided with a pair of upstanding tabs 61 and 62 together forming a transverse guide approximately in alignment with an opening 63 through the web 22. In the use of this structure, the nozzle 56 is arranged so that the spike 57 passes first through the guide formed by the tabs 61 and 62 and then passes through the opening 63. This holds the nozzle in its appropriate upright position against unwanted or accidental dislodgment.

In the general use of the hose nozzle support, it is positioned wherever desired in the ground, usually about to the depth of the step 16 or less, being turned or oriented in the desired direction. The thumb screw 33 being loose, the frame 21 is adjusted to the desired height and then the thumb screw is locked. Either a nozzle of the form shown in FIGURE 5 or a nozzle of the form shown in FIGURES 6 and 7 is utilized and is put into any one of the three possible positions. The torque reaction or dislodging force on the nozzle and hose due to the issuance of the water is adequately resisted by the nonrotatability of the support and by the plurality of support points for the nozzles so that once the operation of irrigation or watering has been started it will continue as set.

When it is desired to change the location of the structure, it is not always necessary to interrupt the water supply, but the thumb screw can be loosened and the height of the setting can be varied, or by grasping the handle 13 the user can withdraw the entire hose nozzle support and the accompanying nozzle and move it to a different location. In all of these uses, the structure is effective to retain the particular adjustment set and is light enough to be carried from point to point, yet is strong enough to withstand the forces acting upon it.

What is claimed is:

1. A hose nozzle support comprising an upright rod having a curved portion at its upper end to serve as a handle, means on said rod adjacent its lower end forming a step for use in forcing said lower end of said rod into the ground, a frame in the form of a channel having a web and a pair of flanges, said flanges having apertures therein to receive both the upright and curved portions of said rod, means in said web for receiving a thumb screw engageable with said rod, means formed in said web and defining a cut out portion therethrough for engagement with a hose nozzle, and means including aligned holes in said flanges for receiving the spike of a spiked hose nozzle supported on said channel above said cut out portion.

2. A hose nozzle support as in claim 1 in which material of said web extends upwardly above said cut out portion for engagement with a spiked hose nozzle having its spike received in said aligned holes.

3. A hose nozzle support comprising an upright non-circular rod having a curved portion at is upper end to serve as a handle, a step fixed on said rod adjacent the lower end thereof, said step including a spade-like plate portion extending a substantial distance on either side of said rod and extending for a substantial distance along said rod, a frame in the form of a channel having a web parallel to said plate portion and a pair of flanges, said flanges having apertures therein to receive said rod slidably but non-rotatably, means on said frame for frictionally engaging said rod in various positions thereon, and means formed in said web on one side of said rod and defining a cut-out portion therethrough for engagement with a hose nozzle.

References Cited by the Examiner

UNITED STATES PATENTS

| | | | |
|---|---|---|---|
| 631,317 | 8/99 | Miller | 248—87 |
| 1,073,874 | 9/13 | Smith | 248—125 |
| 1,233,916 | 7/17 | Roberts | 248—87 |
| 1,447,579 | 3/23 | Thomas | 248—87 |
| 1,780,308 | 11/30 | Morris | 248—86 |
| 2,520,450 | 8/50 | Austin | 248—156 X |
| 2,556,124 | 6/51 | Ullrich | 248—153 |
| 2,592,053 | 4/52 | Megla | 248—79 |
| 2,607,398 | 8/52 | Andrews | 248—44 |
| 2,738,941 | 3/56 | Laurich et al. | 248—145 |
| 2,852,307 | 9/58 | Clark | 248—87 X |
| 2,877,828 | 3/59 | Barnette | 248—156 |
| 2,942,340 | 6/60 | Brown | 30—231 |
| 3,074,674 | 1/63 | Hill | 248—45 |
| 3,143,817 | 8/64 | Paulson | 40—125 |

CLAUDE A. LE ROY, *Primary Examiner.*